US007564668B2

(12) United States Patent
Durth et al.

(10) Patent No.: US 7,564,668 B2
(45) Date of Patent: Jul. 21, 2009

(54) OVERVOLTAGE PROTECTION MEANS

(75) Inventors: Rainer Durth, Horn-Bad Meinberg (DE); Michael Schoeneberger, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 119 days.

(21) Appl. No.: 11/315,165

(22) Filed: Dec. 23, 2005

(65) Prior Publication Data

US 2006/0139838 A1 Jun. 29, 2006

(30) Foreign Application Priority Data

Dec. 28, 2004 (DE) ....................... 20 2004 020 260

(51) Int. Cl.
*H02H 3/22* (2006.01)
*H02H 9/06* (2006.01)

(52) U.S. Cl. ....................... 361/120; 361/117; 411/265; 411/498

(58) Field of Classification Search ................. 361/120, 361/117; 411/265, 498
See application file for complete search history.

(56) References Cited

U.S. PATENT DOCUMENTS 2,169,110 A * 8/1939 Pittman ...................... 361/123
2,545,334 A * 3/1951 Balentine .................... 218/105
2,768,226 A * 10/1956 Rowan, Jr. et al. .......... 373/148
2,909,694 A * 10/1959 Thoren ....................... 313/153
3,064,156 A * 11/1962 Pittman ................. 313/231.21
3,300,672 A * 1/1967 Fisher ........................ 313/120
4,389,693 A * 6/1983 Yanabu et al. ............... 361/127
5,241,446 A * 8/1993 Cosley et al. ............... 361/119
5,604,400 A 2/1997 Altmaier et al.
6,111,740 A 8/2000 Danowsky et al.

FOREIGN PATENT DOCUMENTS

DE 41 41 681 A1 7/1993
WO WO90/06192 * 6/1990

* cited by examiner

*Primary Examiner*—Stephen W Jackson
*Assistant Examiner*—Zeev Kitov
(74) *Attorney, Agent, or Firm*—David S. Safran; Roberts Mlotkowski Safran & Cole, P.C.

(57) ABSTRACT

An overvoltage protection device for use in power supply, especially low voltage systems, is described, with a housing (2), a first electrode (3), at least one second electrode (4), an arc chamber (5) within the housing (2) between the two electrodes (3, 4), and with a breakdown spark gap between the two electrodes (3, 4), an arc forming between the electrodes (3, 4) when the breakdown spark gap is ignited. In order to more reliably prevent the occurrence of a grid follow current and re-ignition of the breakdown spark gap in the overvoltage protection device, at least one outflow and cooling channel (6) is formed in the housing (2) through which the hot plasma from the arc chamber (5) can emerge, the outflow and cooling channel (6) extending in the lengthwise direction of the housing (2) and being helical.

8 Claims, 3 Drawing Sheets

OVERVOLTAGE PROTECTION MEANS

BACKGROUND OF THE INVENTION

1. Field of the Invention

The invention relates to an overvoltage protection means for use in power supply, especially low voltage systems, with a housing, a first electrode, at least one second electrode, an arc chamber which within the housing between the electrodes, and with a breakdown spark gap between the two electrodes. In such overvoltage protection means, when a breakdown spark gap is ignited, an arc forms between the two electrodes.

2. Description of Related Art

Electrical, but especially electronic measurement, control and switching circuits, mainly also telecommunications equipment and systems, are sensitive to transient overvoltages, as can occur especially by atmospheric discharges, but also by switching operations or short circuits in power supply grids. This sensitivity has increased to the extent electronic components, especially transistors and thyristors, are being used; in particular, increasingly used integrated circuits are highly endangered by transient overvoltages.

Electrical circuits normally work without problems using the voltage specified for them, i.e., the rated voltage. This does not apply when overvoltages occur. Overvoltages are all voltages which are above the upper tolerance limit of the rated voltage. They include mainly transient overvoltages which can occur due to atmospheric discharges, but also those due to switching operations or short circuits in power supply grids, and can be galvanically, inductively or capacitively coupled into electronic circuits. Overvoltage protection means have been developed and have been known for more than 20 years to protect electrical or electronic circuits, especially electronic measurement, control and switching circuits, mainly also telecommunications equipment and systems against transient overvoltages wherever they are used.

An important component of an overvoltage protection means of the type under consideration is at least one spark gap which responds at a certain overvoltage, i.e., the sparkover voltage, and thus, prevents overvoltages which are larger than the sparkover voltage of the spark gap from occurring in the circuit which is protected by an overvoltage protection means.

It was stated at the beginning that the overvoltage protection means of the type to which the invention is directed has two electrodes and a breakdown spark gap which acts or exists between the two electrodes. A breakdown spark gap can be an air breakdown spark gap, but can also be a spark gap in which not air, but another gas is found between the electrodes. In addition to overvoltage protection means with a breakdown spark gap, there are overvoltage protection means with a flashover spark gap in which a creeping discharge occurs upon when it responds.

Overvoltage protection means with a breakdown spark gap, compared to overvoltage protection means with a flashover spark gap, have the advantage of a higher surge current carrying capacity, but the disadvantage of a higher and not especially constant sparkover voltage. Therefore, different overvoltage protection means with a breakdown spark gap have already been suggested and have been improved with respect to the sparkover voltage. Here, in the area of the electrodes or the breakdown spark gap which acts between the electrodes, ignition aids have been implemented, for example, such that, between the electrodes, there has been at least one ignition aid which triggers a creeping discharge and which projects at least partially into the breakdown spark gap, which is made in the manner of a crosspiece and which is made of plastic (compare German Patent Application DE 41 41 681 A1 or German Patent Application DE 44 02 615 A1 and corresponding U.S. Pat. No. 5,604,400).

The aforementioned ignition aids which are provided in the known overvoltage protection means can likewise be called "passive ignition aids", therefore "passive ignition aids" because they do not respond "actively" themselves, but respond only by an overvoltage which occurs on the main electrodes.

German Patent Application DE 198 03 636 A1 and corresponding U.S. Pat. No. 6,111,740 disclose an overvoltage protection means with two electrodes, with a breakdown spark gap which acts between the two electrodes, and an ignition aid. In this overvoltage protection means, the ignition aid is made as an "active ignition aid," specifically in that, in addition to the two electrodes, called the main electrodes there, there are two more ignition electrodes. These two ignition electrodes form a second breakdown spark gap which is used as an ignition spark gap. In this overvoltage protection means, the ignition aid includes not only the ignition spark gap, but also an ignition circuit with an ignition switching device. When there is an overvoltage on the overvoltage protection means, the ignition circuit with the ignition switching device provides for response of the ignition spark gap. The two ignition electrodes are arranged with respect to the two main electrodes such that, because the ignition spark gap has responded, the breakdown spark gap between the two main electrodes also responds.

In the known, above described embodiment of overvoltage protection means with ignition aids, the ignition aids lead to an improved, specifically lower and more constant sparkover voltage.

In overvoltage protection means of the type under consideration—with or without using an ignition aid—when the breakdown spark gap ignites, the resulting arc forms a low-impedance connection between the two electrodes. First of all, the transient surge current to be diverted flows intentionally by way of this low-impedance connection. However, when the grid voltage is present, then an unwanted grid follow current follows by way of the low-impedance connection of the overvoltage protection means, so that an effort is made to extinguish the arc as quickly as possible after the completed diversion process. One possibility for achieving this object is to increase the arc length, and thus, the arc voltage after the spark gap responds.

Another possibility for extinguishing the arc after the diversion process consists in cooling the arc by the cooling action of insulation walls and the use of insulators which release gas. Here, a strong flow of the extinguishing gas is necessary; this requires high construction effort.

If the arc is extinguished in overvoltage protection means of the type under consideration, first of all, the low-impedance connection between the two electrodes is broken, the space between the two electrodes, i.e., the arc chamber, is however still almost completely filled with plasma. The plasma which is present reduces the sparkover voltage between the two electrodes such that, at the prevailing operating voltage, re-ignition of the breakdown spark gap can occur. This problem occurs especially when the overvoltage protection means has an encapsulated or only half-open housing, since then cooling or volatilization of the plasma is prevented by the essentially closed housing.

To prevent re-ignition of the overvoltage protection means, i.e., the breakdown spark gap, in the past, various measures were taken to drive the ionized gas cloud away from the ignition electrodes or to cool it. However, here, it must be considered that the hot plasma may not simply be blown out of the housing, since otherwise adjacent system parts can be destroyed and there is the danger that individuals located in the vicinity could be injured by the hot gases which are flowing out under high pressure. Therefore, known overvoltage protection means often have several chambers into which the hot plasma can escape after ignition or it is actively driven by blowing. Then, the plasma can cool in the chambers. One disadvantage of these overvoltage protection means, which have the corresponding chambers, consists in that, if the chambers are to be completely closed, very large volumes are necessary so that the dimensions of the overvoltage protection means greatly increase overall.

SUMMARY OF THE INVENTION

A primary object of the present invention is to develop an overvoltage protection means of the initially described type such that the occurrence of a grid follow current and re-ignition of the breakdown spark gap are even more reliably prevented.

This object is achieved, in the initially described overvoltage protection means, in that at least one outflow and cooling channel is formed in the housing through which the hot plasma from the arc chamber can emerge, the outflow and cooling channel extending in the lengthwise direction of the housing and being made helical. Due to the helical execution of the outflow and cooling channel, it has a length which can be many times greater than the length of the housing. The lengthening of the blowout path which is achieved in this way results in a high braking action of the hot plasma so that the pressure wave emerging to the outside from within the housing is so small that damage to adjacent system parts is prevented.

Due to the helical execution of the outflow and cooling channel and the high braking action achieved thereby for the hot plasma, the outflow and cooling channel can have a relatively large cross section, so that a rapid reduction of the high pressure within the housing and thus prompt pressure relief of the inner area occur. The rapid dissipation of the thermal energy enclosed in the housing to the outside prevents damage to components located within the housing, especially plastic parts.

According to one especially preferred embodiment of the overvoltage protection means of the invention, the outflow and cooling channel is implemented by the housing being made in two parts, the two housing parts being arranged coaxially to one another, and the intermediate space between the two housing parts being made as an outflow and cooling channel for the ionized gas. Advantageously, the inner housing part has an external thread and the outer housing part has a corresponding internal thread, so that in the completely installed state of the overvoltage protection means, the inner housing part is screwed into the outer housing part. Because the housing is in two parts and due to the use or execution of the thread between the inner housing part and the outer housing part as the outflow and cooling channel, a maximum area is available for cooling of the hot plasma. In addition, implementing the outflow and cooling channel between the two housing parts results in that the hot plasma, as it flows out, has no further contact with the plastic parts which are generally located in the housing interior, by which, as described above, destruction of the plastic parts is prevented, and moreover, an additional increase of the pressure by release of gas when the plastic dissociates is avoided.

To further reduce the pressure and the temperature of the gas emerging from the housing, according to a preferred embodiment of the invention, it is provided that the external thread of the inner housing part and/or the internal thread of the outer housing part is partially interrupted so that one or more chambers are formed between the inner housing part and the outer housing part. In these chambers which are made between the two housing parts, the plasma can cool further without the need for a corresponding additional volume within the overvoltage protection means for this purpose. If the two housing parts are made of steel, the housing, relative to the other components of the overvoltage protection means, has the greatest mass for intermediate storage of the thermal energy. In addition, the steel housing, as compared to the plastic parts being used for insulation within the housing, has a much higher heat capacity and higher heat resistance. As a result, in conjunction with the large surface of the steel housing or the two housing parts, not only good intermediate storage of the thermal energy in the outer area of the overvoltage protection means, but also direct energy release to the environment are possible.

The above described two-part construction of the housing, the two housing parts being arranged coaxially to one another, moreover, offers the possibility of screwing the housing parts to one another over the maximum length. In this way, in addition to lengthening the blowout path formed between the internal thread of the outer housing part and the external thread of the inner housing part, the compressive strength of the overvoltage protection means is also increased, especially in the axial direction.

Advantageously, accommodation of the compressive load by the housing can be further increased by the inner housing part having an at least partially conical outside periphery and the outer housing part having an at least partially conical inside periphery so that the screwed joint between the inner housing part and the outer housing part is conical. The conicity of the screwed joint enables the inner housing part and the outer housing part to be made such that the two housing parts have the maximum wall thickness on their ends facing away from one another, on which the two housing parts must each accommodate the pressure alone. Conversely, the wall thickness of the inner and outer housing parts tapers towards the other ends so that, wherever the pressure load for the individual housing parts is least, their wall thickness also is minimal.

In addition to increasing the maximum compressive strength of the housing, the conical configuration of the two housing parts also results in that the housing overall has both a constant inside diameter and a constant outside diameter, by which high utilization of the existing volume, and thus, for given requirements, a small overall size, can be achieved.

In particular, there is a host of possibilities for embodying and developing the overvoltage protection means in accordance with the invention. In this regard reference is made to the following detailed description of a preferred embodiment in conjunction with the accompanying drawings.

BRIEF DESCRIPTION OF THE DRAWINGS

FIG. 2 is a partial longitudinal sectional view of an outer housing of an overvoltage protection means in accordance with the invention, showing an elevational view of the inner housing in

DETAILED DESCRIPTION OF THE INVENTION

Figure 1:
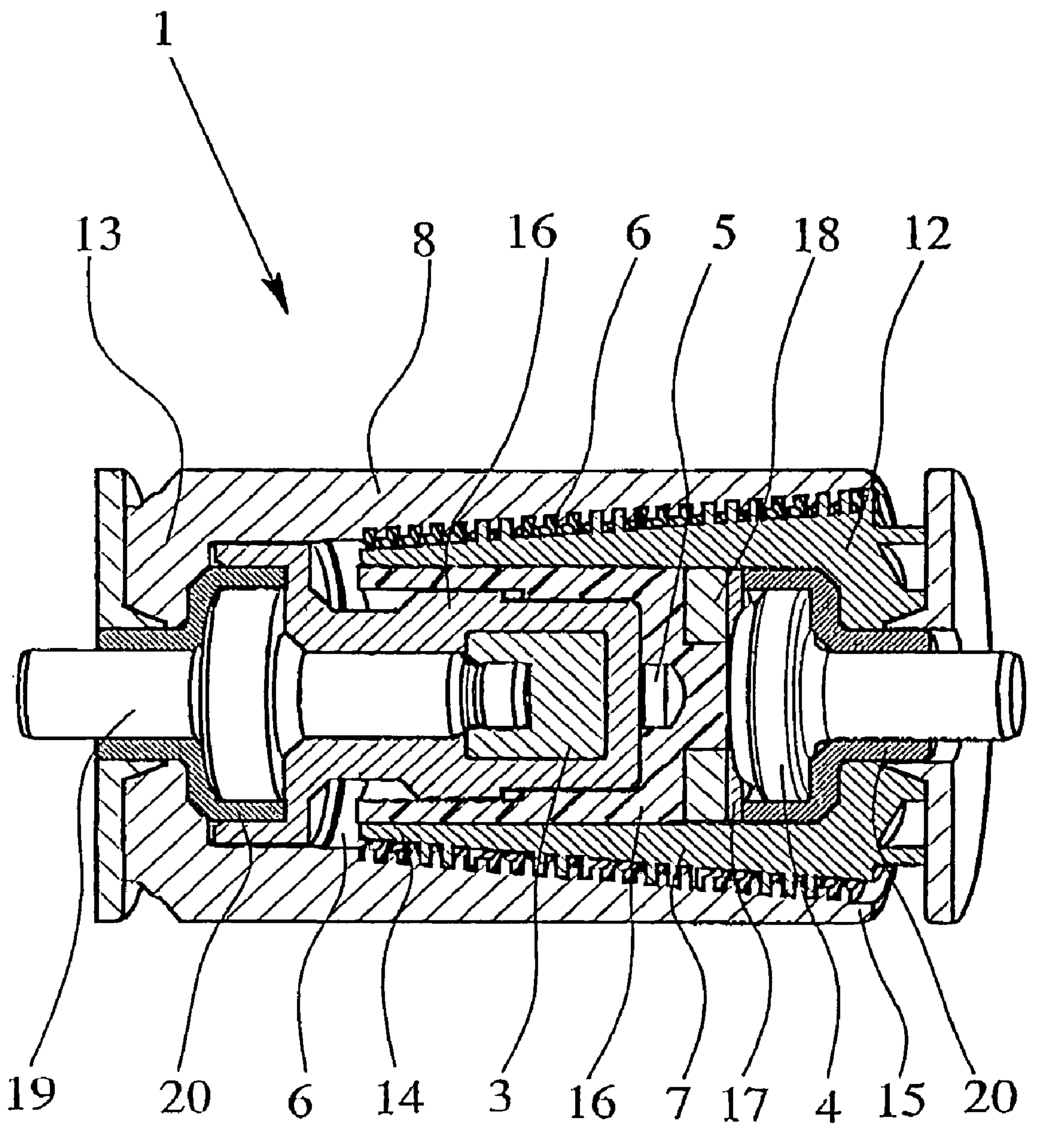
FIG. 1 is a partial longitudinal sectional view of an embodiment of an overvoltage protection means of the invention.
Figure 2:
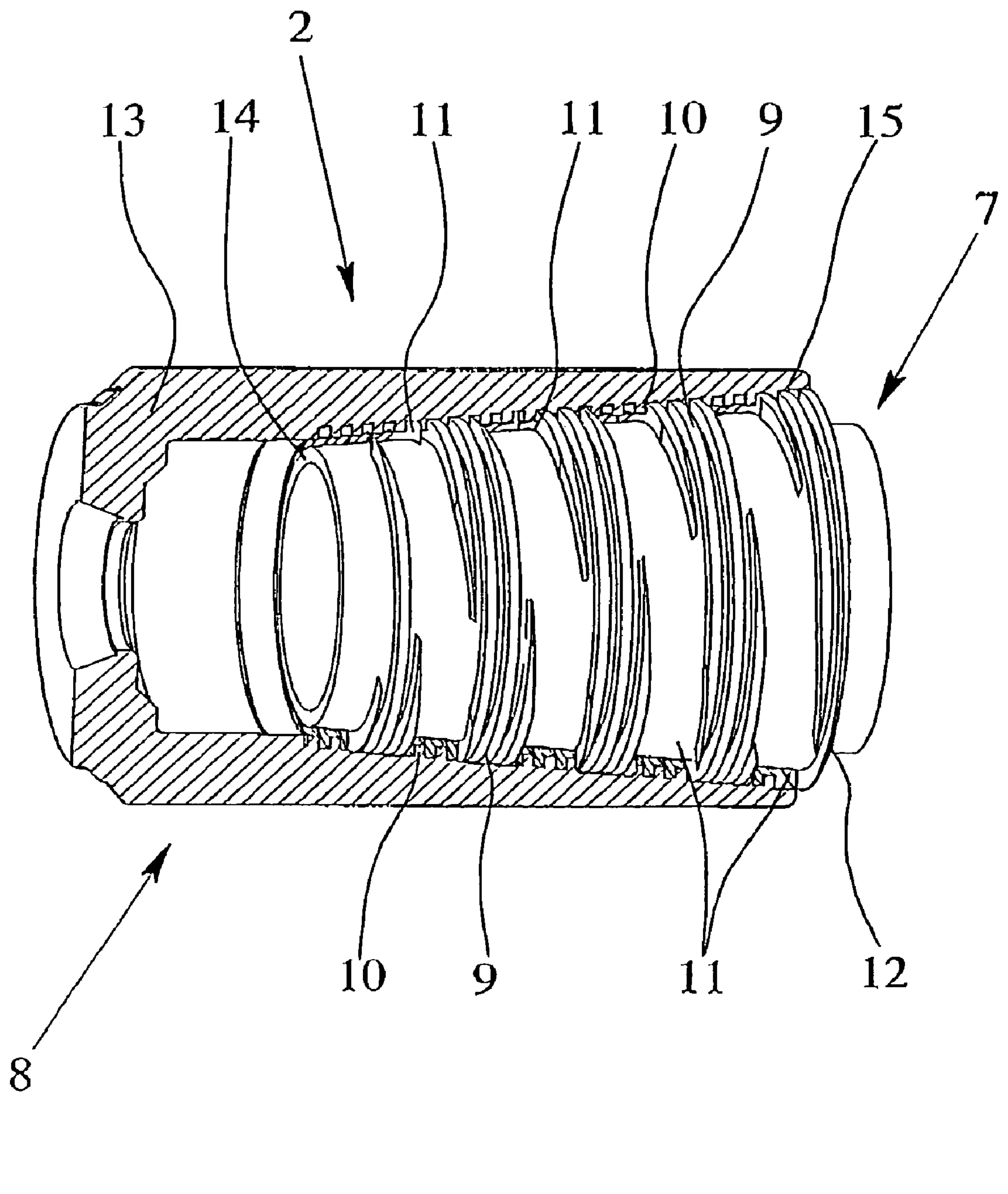
Figure 3:
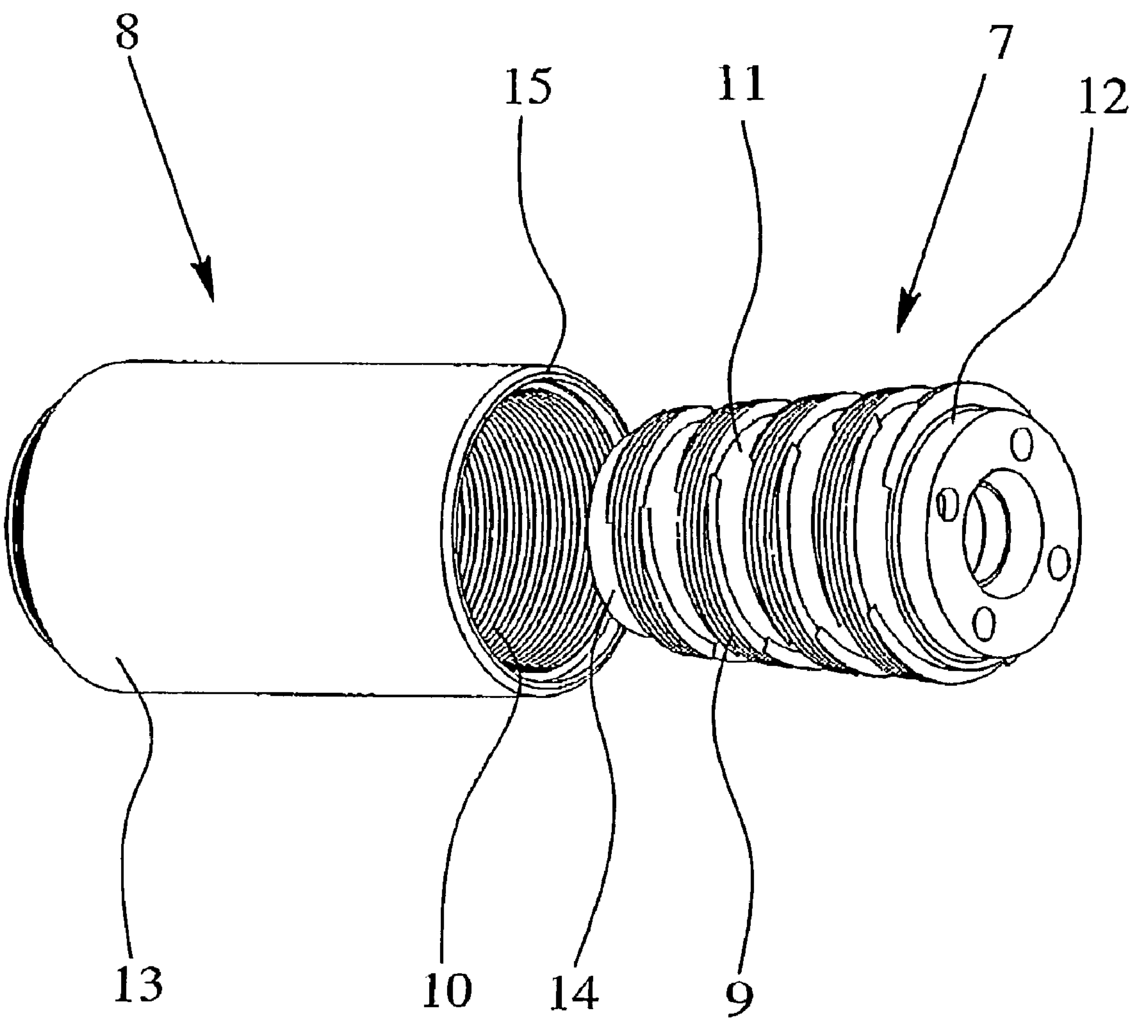
FIG. 3 is an exploded perspective of the two housing parts of the overvoltage protection means of the invention.

FIG. 1 shows an embodiment of an overvoltage protection means 1 in accordance with the invention, with a housing 2 which is shown in greater detail in FIGS. 2 & 3. The overvoltage protection means 1 includes, in addition to the housing 2, two electrodes 3, 4, the two electrodes 3, 4 being opposite one another and an arc chamber 5 being formed between them. Not apparent from the cross section of FIG. 1, is that the arc chamber 5 is made such that it connects the two electrodes 3, 4 to one another, the arc chamber 5, however, running partially obliquely to the lengthwise extension of the overvoltage protection means 1. In this way, a discharge space or discharge channel is formed which runs obliquely to the direction of the electrical field of the prevailing grid voltage so that the distance to be crossed by the arc between the two electrodes 3, 4 has a transverse component to the electrical field. This leads to the fact that, after ignition of the breakdown spark gap, the electrical voltage which is present on the two electrodes 3, 4 can no longer continuously accelerate the free charge carriers contained in the arc chamber from one electrode to the other electrode, by which the arc can be extinguished.

Since the arc chamber 5 is still filled with hot plasma after extinguishing of the are, by which the sparkover voltage between the two electrodes 3, 4 is very greatly reduced so that, at the prevailing operating voltage, the breakdown spark gap can be re-ignited, an outflow and cooling channel 6 is formed in the housing 2 by which the hot plasma can emerge from the arc chamber 5. The helical outflow and cooling channel 6 which is connected to the arc chamber 5 within the housing 2 is implemented in the overvoltage protection means 1 as claimed in the invention in that the housing 2 has a first, inner housing part 7 and a second, outer housing part 8, the intermediate space between the two housing parts 7, 8, forming the outflow and cooling channel 6.

FIG. 1, and also FIGS. 2-3, show that the inner housing part 7 has an external thread 9 and the outer housing part 8 has a corresponding internal thread 10 so that the inner housing part 7, in the completely assembled state as shown in FIG. 1, is screwed into the outer housing part 8. By making the external thread 9 and the internal thread 10 of a differing height, the intermediate space which forms the outflow and cooling channel 6 can extend between the ends of the shorter threads and the valley between the higher threads.

Due to the helical execution of the outflow and cooling channel 6, it has a length which is much greater than the length of the housing 2 of the overvoltage protection means 1. In this way, a high braking action of the hot plasma is achieved within the outflow and cooling channel 6, so that the outflow and cooling channel 6 can have a relatively large cross section without the danger that the gas emerging from the overvoltage protection means 1 will destroy adjacent system parts or injure individuals.

In order to further increase the cooling of the hot plasma between the metal housing parts 7, 8, the external thread 9 of the inner housing part 7 is partially interrupted so that several chambers 11 are formed between the inner housing part 7 and the outer housing part 8. Of course, the internal thread 10 of the outer housing part 8 can, alternatively or additionally, have corresponding unthreaded sections.

The dual shell structure of the housing 2 accomplished by the two housing parts 7, 8 enables the two housing parts 7, 8 to be screwed together with their corresponding threads 9, 10 over a maximum length, by which also the compressive strength of the housing 2 in the axial direction is increased. Here, the first, inner housing part 7 has an essentially conical outside periphery and the second, outer housing part 8 has a corresponding conical inside periphery so that the screwed joint between the inner housing part 7 and the outer housing part 8 is made entirely conical. As is apparent from the cross sections of FIGS. 1 & 2, the inner housing part 7 and the outer housing part 8 on their opposite ends 12, 13, have the maximum wall thickness, while the wall thickness of the inner housing part 7 and the outer housing part 8 taper toward the other end 14, 15, respectively. Thus, the two housing parts 7, 8 on the ends 12, 13 on which they must each accommodate the pressure alone are maximum in terms of their wall thickness. The conical execution of the two housing parts 7, 8, moreover, results in that the housing 2, altogether, has both a constant inside diameter and also a constant outside diameter, by which, for given requirements, a very small overall size of the overvoltage protection means 1 can be achieved.

FIG. 1 shows that the housing interior is lined with insulating material 16, by the configuration of the insulating material 16 which can be, for example, a thermoplastic, the dimensions of the arc chamber 5 and of the connecting channel from the arc chamber 5 to the outflow and cooling channel 6 are established. Moreover, the overvoltage protection means 1 shown in FIG. 1 has another ignition element 17 and an ignition electrode 18 which can be used jointly as an ignition aid and by which the sparkover voltage of the overvoltage protection means 1, optionally together with an ignition switching device, can be set to the desired value. To make electrical contact with the first electrode 3, which is located in the interior of the housing 2, there is an electrode holder 19 which, like the electrode 4, is electrically insulated from the housing 2 by means of the insulating part 20. In contrast to the two electrodes 3, 4, which generally are made of copper-tungsten, the electrode holder 19 is made predominantly of brass.

The configuration of the housing 2 which was described above, especially the execution of the two housing parts 7, 8, and the execution and use of the threaded joint between the two housing parts 7, 8, as the outflow and cooling channel 6, provides an overvoltage protection means 1 in which the occurrence of an unwanted grid follow current after the actual diversion process and re-ignition of the breakdown spark gap are more reliably prevented, the housing 2, moreover, having very high compressive strength.

What is claimed is:

1. Overvoltage protection means for use in power supply, comprising:
- a housing,
- a first electrode and at least one second electrode in the housing,
- an arc chamber between the two electrodes within the housing, and
- a breakdown spark gap between the two electrodes, an arc forming between the two electrodes when the breakdown spark gap is ignited,
- wherein at least one outflow and cooling channel is formed in the housing through which hot plasma from the arc chamber can emerge, the at least one outflow and cooling channel extending in a lengthwise direction of the housing and being helical,
- wherein the housing is formed of two parts arranged coaxially relative to one another,
- wherein the two housing parts comprise a first, inner housing part that has an external thread and a second, outer housing part that has a corresponding internal thread, and wherein the inner housing part is screwed into the outer housing part, wherein the thread between the inner housing part and the outer housing part forms the at least one outflow and cooling channel, wherein the at least one outflow and cooling channel is substantially longer than the length of the housing, and wherein the external thread and the internal thread have a differing height so as to form an intermediate space therebetween.

2. Overvoltage protection means as claimed in claim 1, wherein at least one of the external thread of the inner housing part and the internal thread of the outer housing part is partially interrupted so that at least one chamber is formed between the inner housing part and the outer housing part.

3. Overvoltage protection means as claimed in claim 2, wherein the inner housing part has an at least partially conical outside periphery and the outer housing part has an at least partially conical inside periphery so that a conical screwed joint is formed between the inner housing part and the outer housing part.

4. Overvoltage protection means as claimed in claim 1, wherein the inner housing part has an at least partially conical outside periphery and the outer housing part has an at least partially conical inside periphery so that a conical screwed joint is formed between the inner housing part and the outer housing part.

5. Overvoltage protection means as claimed in claim 4, wherein the inner housing part and the outer housing part each have a maximum wall thickness on end portions thereof which face away from one another, and wherein the wall thickness of the inner housing part and the outer housing part tapers in a direction away from said end portions.

6. Overvoltage protection means as claimed in claim 1, wherein the housing is made of steel.

7. Overvoltage protection means as claimed in claim 1, wherein the arc chamber is lined at least partially with an insulating material and runs at least partially transversely relative to a lengthwise extension of the overvoltage protection means.

8. Overvoltage protection means as claimed in claim 1, wherein the housing parts are made of steel.

* * * * *